June 22, 1943.    L. A. SAFFORD    2,322,544
LUBRICATOR
Filed June 11, 1942
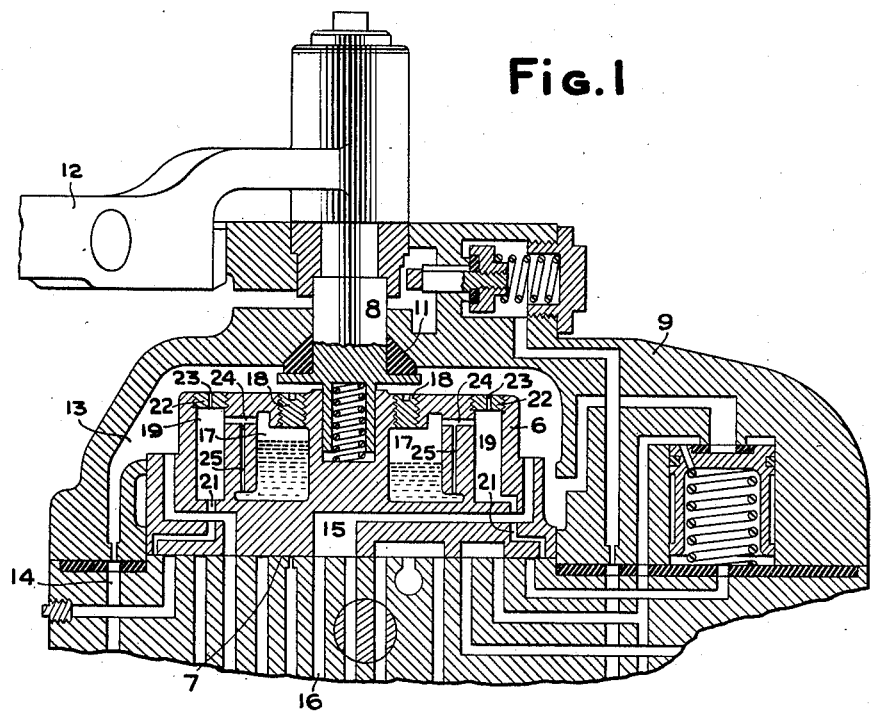
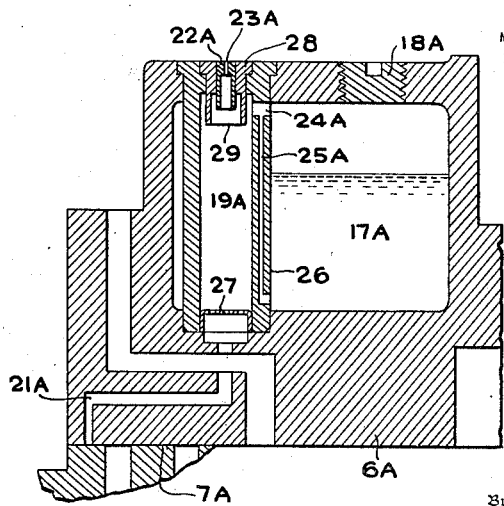
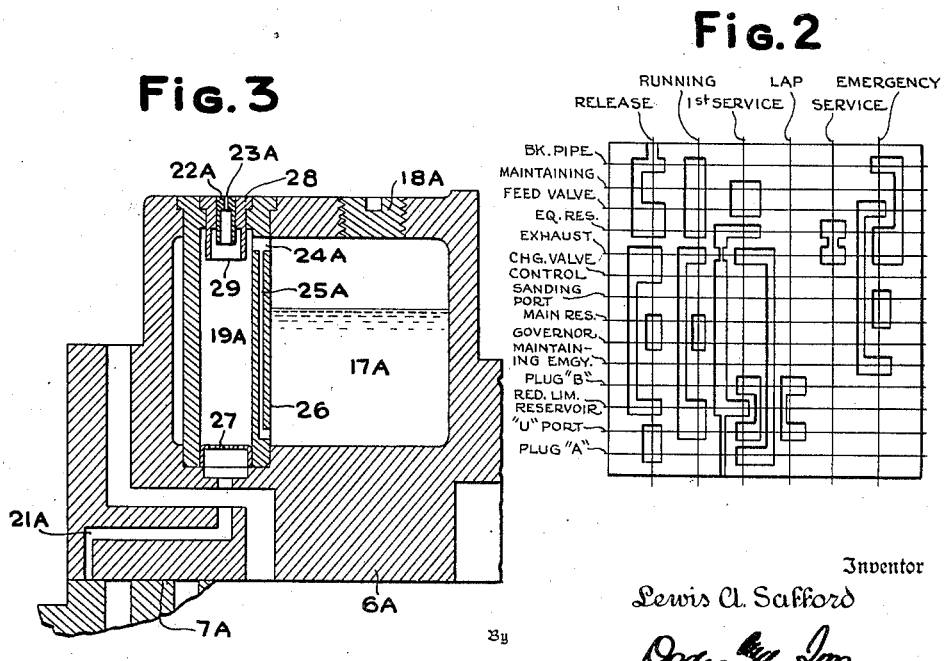
Inventor
Lewis A. Safford
Attorneys Patented June 22, 1943

2,322,544

UNITED STATES PATENT OFFICE 2,322,544

LUBRICATOR

Lewis A. Safford, Watertown, N. Y., assignor to The New York Air Brake Company, a corporation of New Jersey Application June 11, 1942, Serial No. 446,677

9 Claims. (Cl. 303—56)

This invention relates to air brakes and particularly to lubricators for valves requiring controlled light lubrication, over substantial periods of time, and only as an incident to actual operation of the valve.

As a basis for disclosure, the invention will be described as applied to the rotary valve of an engineer's brake valve which has heretofore proved to offer a particularly troublesome lubrication problem, but the invention is applicable generally to lubrication of any sealed surfaces, particularly valve surfaces where actuating pneumatic pressure surges are available. Thus the invention involves not merely the lubricator in combination with a particular brake valve, with which it secures new and valuable results, but also the lubricator itself.

Applicant's assignee has actively attacked the elusive problem of lubricating the rotary valves of engineer's brake valves by oil delivered at controlled rates from a reservoir in the rotary valve itself. The Campbell Patent No. 2,271,894, issued February 3, 1942, is typical and shows a control scheme which is successful and can commonly be availed of by an even simpler embodiment than that illustrated in the Campbell patent.

However, when this Campbell type of lubricator was applied to an L-8-PA brake valve difficulty was experienced in obtaining accurate adjustment of the oil feed rate. A study of the performance demonstrated that the erratic oil feed was caused by sudden and marked changes of air pressure acting in the cap and hence on the back of the rotary valve, and on the oil in the reservoirs.

In the L-8-PA brake valve, a rapid and pronounced pressure change from feed valve pressure to main reservoir pressure, or vice versa, occurs each time the brake valve is moved to or from "release" position. If the L-8-PA brake valve is equipped with the well known Model F feed valve (Campbell Patent No. 1,781,747, Nov. 18, 1930, shows the basic principle of this feed valve) the above pressure change will occur whenever the brake valve handle is moved out of running position.

While the more frequent pressure changes, which occur with the Model F type feed valve, make the use of the present invention particularly desirable, the invention is not limited to use with this particular feed valve, nor with any particular brake valve. Indeed, its use is not even limited to brake valves.

The concept underlying the present invention is the use of pressure surges to control oil feed, and thus apply usefully the factor which impairs the utility of prior art lubricating systems designed for engineer's brake valves. Developed from this general concept, is a surge actuated lubricator of novel form, which affords compactness; adjustable oil feed, with a possible very minute feed per cycle; stability of feed despite variations of oil level in the reservoir; and general adaptability to use in various environments, particularly those where a sealed area is to be lubricated and pressure surges are available.

The invention will now be described as applied to an L-8-PA brake valve by reference to the accompanying drawing in which:

Fig. 1 is a vertical axial section of the rotary valve portion of an L-8-PA brake valve in running position, showing two of the surge operated lubricators mounted in the rotary valve.

Fig. 2 is a port diagram of the rotary valve showing, according to a familiar convention, the connections established by the valve in its various positions.

Fig. 3 is an enlarged fragmentary section of a rotary valve with a self-contained insertion type lubrication controller in place.

It is needless here to recount all the complicated functions of the brake valve and only significant parts will be identified.

The rotary valve 6 is turned on seat 7 by key 8 which is swiveled in cap 9 and sealed by packing 11. The key 8 is turned by handle 12 and establishes six positions known as "release," "running," "first service," "lap," "service" and "emergency." As viewed in plan, the valve turns counter-clockwise less than 180° in moving from "release" to "emergency" position. The connections established are diagrammed in Fig. 2 but being a part of prior commercial practice require no elaboration except in the following detail which depends on use of a Model F feed valve or a valve of similar type.

The feed valve (not shown) supplies air to space 13 within cap 9 and above rotary valve 6 by way of port 14. In running position a port 15 in the rotary valve 6 connects space 13 with port 16 which leads to the control pipe of the feed valve (not shown). This connection is interrupted in application and lap position, and it results that space 13 is at feed valve pressure in running positions but pressure rises rapidly to main reservoir pressure in application and lap positions.

The fact of the change of pressure, rather than the particular cause thereof, is the significant thing as to the invention, and this particular brake valve is chosen for illustration merely as typical of valves subject to pressure surges in space 13 (or its analog).

Formed in rotary valve 6 are two oil reservoir cavities 17 with filling openings at the top, sealed by screw plugs 18. The cavities 17 do not communicate with each other. Adjacent each reservoir is a surge chamber 19 with an oil feed passage 21 leading from its bottom to the seated area of valve 6. Port 21 terminates preferably near the periphery of rotary valve 6.

Screwed into the top of each surge chamber 19 is a choke plug 22 with choke port 23. A cross port 24 connects surge chamber 19 with reservoir 17 above the maximum level of oil therein. The port 24, though restricted, should be large enough to avoid capillary effects. A capillary passage 25 leads from a point near the bottom of reservoir 17 to passage 24. This is the preferred construction but other capillary feeds could be substituted.

Capillary passage 25 fills with oil by capillary flow and air surging through passage 24 carries part of this to surge chamber 19 whence it feeds at least partly by gravity to the seated area of rotary valve 6.

The rate of delivery of oil to chamber 19 can be varied by varying the relative sizes of passage 24 and choke 23. In practice it is convenient to adjust flow by interchanging choke plugs 22 having choke ports 23 of graduated sizes.

In this connection it should be observed that chamber 19 is a cushioning volume between choke 23 and port 24 and is an important factor in the action of the device. It reduces the effect of variation of the air filled space above the oil in reservoir 17 and permits reasonable stabilization of the feed rate.

The use of two lubricators in one rotary valve is convenient but not essential. One or more may be used.

*Modification, Figure 3*

In this embodiment the porting is essentially the same as in Fig. 1, and corresponding parts are identified by the numerals used on Fig. 1 with the distinguishing letter A.

Instead of forming the ports directly on the body of the valve 6A they are all carried by a cylindrical sleeve 26 pressed to place. This has a screen 27 mounted on its lower end. The choke plug 22A is pressed into an encircling plug 28, which is pressed into an opening in the upper end of sleeve 26. Plug 28 carries a pendant skirt or baffle 29, which laps port 24A and intercepts droplets of oil. These then drip from its lower margin.

The modified form provides an interchangeable unit of refined design which may be tested for feed rate prior to insertion in the valve. Also it is available for use in various environments where lubrication in response to pressure surges is desired. Functionally it is the same as the form shown in Fig. 1, for the baffle 29 does not materially change the operative characteristics.

*General considerations*

Coordination of the volume of surge chamber 19 with the maximum and minimum air volume in reservoir 17, will establish sufficiently uniform surging flow through port 24 to assure feed over the entire range. Adjustment of the size of choke 23 or the size of port 24 or both may be availed of to establish rates which will remain reasonably uniform as the oil in the reservoir diminishes.

The surge chamber 19 with choke 23 is an important factor in stabilizing the operation of lubricators of the air surge type, particularly where, as in the examples illustrated, the oil reservoir volume must be limited, and the air volume over the oil is subject to marked change as an incident to oil consumption.

The embodiments illustrated are intended to illustrate the principle of the invention, and no limitation to the illustrated embodiments is implied. The scheme can be used to lubricate the rotary valve of any engineer's brake valve in which the necessary actuating pressure surges are present. Other devices in which pressure surges are available are triple valves, emergency valves, local quick service valves, train signal valves etc. etc. and in many of these, lubrication with protection against excessive lubrication is required.

I claim:

1. The combination of a valve seat; a valve movable thereon and subject on its back to pressure surges; means forming a surge chamber in restricted communication with the space in which pressure surges occur, and having an oil feeding communication with the sealed area of contact between valve and seat; a closed oil reservoir adapted to be partly filled with oil; means forming a restricted, non-capillary flow path between the reservoir above the level of oil therein and the surge chamber; and capillary means for feeding oil from the reservoir to said flow path.

2. The combination of a valve seat; a valve movable thereon and subject on its back to pressure surges; means forming a surge chamber in restricted communication with the space in which pressure surges occur, and having an oil feeding communication with the sealed area of contact between valve and seat; a closed oil reservoir adapted to be partly filled with oil; means forming a restricted, non-capillary flow path between the reservoir above the level of oil therein and the surge chamber; and a capillary passage leading from a point near the bottom of said reservoir to said flow path, the capillary passage being so dimensioned that it normally maintains itself oil-filled to the point of junction with the flow path.

3. The combination defined in claim 2 in which the surge chamber and oil reservoir are formed in the valve, and the restricted communication is afforded by a choke plug removably mounted in the valve between the surge chamber and the space at the back of the valve.

4. In a lubricator for operation by pneumatic pressure surges, the combination of means forming a surge chamber in restricted communication with a space in which pneumatic pressure surges occur and in communication near its bottom with a sealed area to be lubricated; a closed oil reservoir; means forming a restricted flow path between said reservoir above the level of oil therein, and said surge chamber; and capillary means for feeding oil from the reservoir to said flow path.

5. In a lubricator for operation by pneumatic pressure surges, the combination of means forming a surge chamber in restricted communication with a space in which pneumatic pressure surges occur and in communication near its bottom with a sealed area to be lubricated; a closed oil reservoir; means forming a restricted non-capillary flow path between said reservoir above the level of oil therein, and said surge chamber; and a self-filling capillary passage leading from the reservoir below the oil level therein to said flow path.

6. In a lubricator for operation by pneumatic pressure surges, the combination with a space subject to such surges, of means forming a surge chamber in communication near its bottom with a sealed area to be lubricated; a removable choke interposed between said space and said chamber; a closed oil reservoir; means affording a restricted flow path between the surge chamber and the reservoir above the level of oil therein; and capillary means for feeding oil from the reservoir to said flow path.

7. In a lubricator for operation by pneumatic pressure surges, the combination with a space subject to such surges, of means forming a surge chamber in communication near its bottom with a sealed area to be lubricated; a removable choke interposed between said space and said chamber; a closed oil reservoir; means affording a flow path less restricted than said choke between the surge chamber and the reservoir above the level of oil therein; and capillary means for feeding oil from the reservoir to said flow path.

8. The combination of a body subject to pneumatic pressure surges and enclosing an oil chamber, and having a bore which extends across said chamber, and from the inner end of which an oil port extends to a sealed area to be lubricated; an open ended sleeve filling and sealing in said bore and at its inner end encircling said oil port, said sleeve enclosing a surge chamber in communication with the oil port, and having formed in the sleeve a surge passage which connects the surge chamber with the upper portion of the oil chamber and a capillary passage which connects the lower portion of the oil chamber with the surge passage; and a choke plug mounted in the outer end of said sleeve to control transmission of pressure surges thereto.

9. The combination of a body subject to pneumatic pressure surges and enclosing an oil chamber, and having a bore which extends across said chamber, and from the inner end of which an oil port extends to a sealed area to be lubricated; an open ended sleeve filling and sealing in said bore and at its inner end encircling said oil port, said sleeve enclosing a surge chamber in communication with the oil port, and having formed in the sleeve a surge passage which connects the surge chamber with the upper portion of the oil chamber and a capillary passage which connects the lower portion of the oil chamber with the surge passage; a choke plug mounted in the outer end of said sleeve to control transmission of pressure surges thereto; and a baffle carried by the sleeve and interposed between the surge passage and the choke.

LEWIS A. SAFFORD.